324-110
SR
05-16-72 XR 3,663,807

United States Patent [15] 3,663,807
Hecker [45] May 16, 1972

[54] STATISTICAL CORRELATING DEVICE

[72] Inventor: Klaus J. Hecker, Oberursel, Taunus, Germany
[73] Assignee: The United States of America as represented by the Secretary of the Navy

[22] Filed: Aug. 24, 1966
[21] Appl. No.: 575,225

[52] U.S. Cl. ....235/181, 324/77 G, 328/135, 328/147
[51] Int. Cl. ....G06f 15/34
[58] Field of Search ....235/181; 324/77 G; 330/69; 328/144, 135, 147

[56] References Cited

UNITED STATES PATENTS 3,510,669 5/1970 Peraza ....235/181
3,290,506 12/1960 Bertram ....235/181 X

*Primary Examiner*—Benjamin A. Borchelt
*Assistant Examiner*—Birmiel H. A.
*Attorney*—George J. Rubens and H. H. Losche

[57] ABSTRACT

A statistical correlating device for comparing signal elements of a video image received from a camera pickup tube with previously stored signal elements of a video image simultaneously received from a storage tube, for determining the relative spatial deviation between respective signal elements of the two video images. The device employs a plurality of input channels for simultaneously receiving the two video image signals to be spatially compared, each channel including a match determiner comparing circuit for forming the absolute value of the difference between the two input signals, and an emitter follower circuit for providing a necessary low driving impedance. The plurality of channels terminate in a combining network resistor matrix which multiplies the difference signals representative of spatial deviation between the two video images by values representing the spatial location of the source of the stored video image signal in each channel. A pair of differential amplifiers within the combining network combine the signals into left/right and up/down control signals which may be used for positioning the gimbals of the pickup camera in such manner as to cause the spatial deviation between the camera and stored video images to be reduced to zero.

1 Claim, 3 Drawing Figures

Patented May 16, 1972

3,663,807

2 Sheets-Sheet 1

INVENTOR.
KLAUS J. HECKER

BY

H. H. Losche

ATTY.

Patented May 16, 1972 3,663,807

2 Sheets-Sheet 2

INVENTOR.
KLAUS J. HECKER
BY
H. H. Losche
ATTY.

STATISTICAL CORRELATING DEVICE

This invention relates to a device for comparing electrical signals for image correlation and more particularly to a device which compares the video signals received from a camera with the video signals from a storage tube. The device then determines on the basis of this comparison, the deviation of the position of each camera image element from the position of that element of the storage tube reference image which represents the same point on a target scene.

SUMMARY OF THE INVENTION

The video comparison and target position functions are performed in this invention by comparing a video signal from the camera with a matrix of video signals from the storage tube (or vice versa). Both the camera image and the storage tube reference image are divided into corresponding resolution elements and this permits the comparison of one signal with a matrix of signals. The comparison results are coupled to a combining circuit which applies multiplying factors to the comparator signals, thereby giving them position information. These signals are then added and the result indicates the position in the matrix which corresponds to the camera image element. It can be seen therefore, that this output information, from the combining circuit, may be used to continually reposition the camera. If this comparator circuitry must be used in low-light-level systems, noise signals become appreciable with respect to the actual video signal and this inherent situation must be accounted for. Therefore, it is a general object of this invention to provide an image correlator which combines a minimum of noncomplex circuitry to perform its function, and which is effective in a low-light-level system.

BRIEF DESCRIPTION OF THE DRAWINGS

Other objects, advantages, and novel features of the invention will become apparent from the following detailed description of the invention when considered in conjunction with the accompanying drawings, in which.

DESCRIPTION OF THE PREFERRED EMBODIMENT

Figure 1:
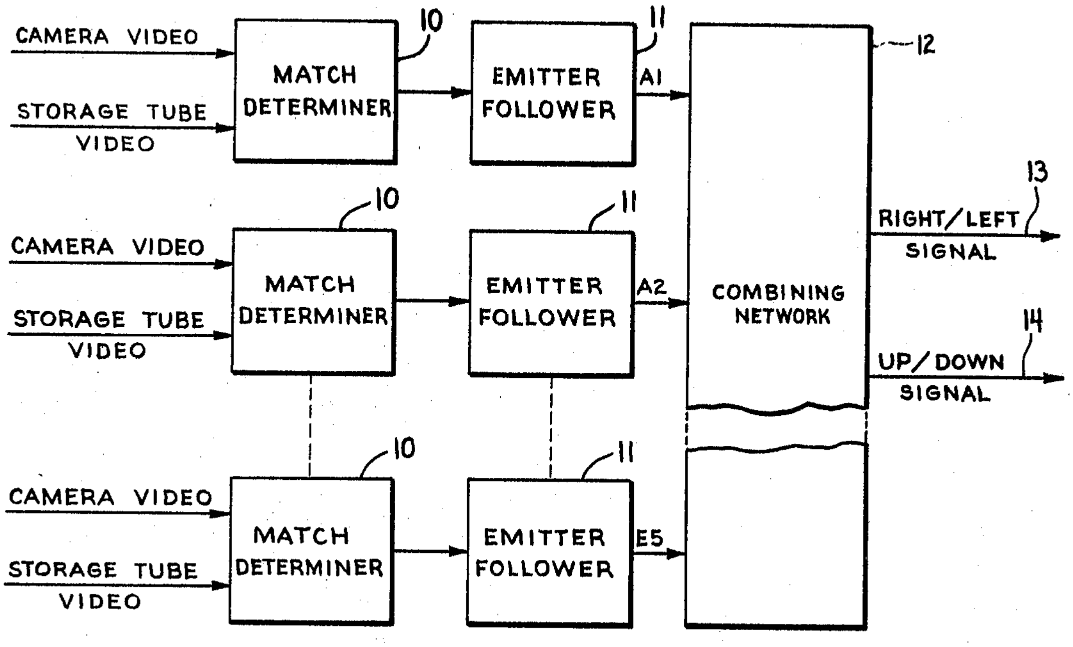
FIG. 1 shows a partial block diagram of the circuitry used in the invention.

In the embodiment of the invention as shown in FIG. 1, a match determiner 10 is a circuit which performs its function by subtracting the storage tube video signal from the camera video and providing an output equal to the absolute value of this subtraction. Match determiner 10 may be comprised of any suitable two-input differential amplifier capable of producing as an output signal, the absolute value of the difference between the two input signals while introducing a fixed bias voltage ($U_m$). Many suitable differential amplifier circuits of this type are well known in the art. One example of a differential amplifier suitable for producing the difference between the camera video and storage video signals is shown in FIG. 15, page 100, of the book entitled *Differential Amplifiers*, by R. D. Middlebrook (John Wiley and Sons, Inc., New York, 1963). The camera video signal would be applied to the base electrode of one of the differential transistors ($Q_{1a}$ and $Q_{1b}$) and the storage tube video signal would be applied to the base electrode of the other differential transistor. A two-diode absolute value circuit, of the type shown in FIG. 8.26, page 263, of the book entitled *Introduction To Analog Computation*, by J. Robert Ashley (John Wiley and Sons, Inc., 1963), would be utilized with the differential amplifier by coupling the anode of diode $D_1$ directly to the collector electrode output terminal of one of the differential transistors ($Q_{1a}$ and $Q_{1b}$), and by coupling the anode of diode $D_2$ directly to the collector electrode output terminal of the other differential output transistor, with the common cathode junction of the two diodes serving as the output terminal of match determiner 10 for providing thereat, the absolute value of the difference between the two video input signals. The unity gain inverting amplifier shown in the two-diode absolute value circuit of FIG. 8.26 is unnecessary when the diodes are to be utilized with the two outputs of a differential amplifier. With the diodes $D_1$ and $D_2$ polarized as shown in FIG. 8.26, the absolute value of the difference between these two video input signals produced by match determiner 10 will be the positive. If the negative of the absolute value were desired, it could be obtained by reversing the polarity of diodes $D_1$ and $D_2$. These two video signals comprise the inputs to the match determiner 10, and the output is coupled through an emitter follower 11 to a combining network 12. The emitter follower 11 serves as an impedance matching device so that the signal may drive the combining network. The dotted line through FIG. 1 is to indicate that not all of the match determiners or emitter followers are shown. In this description of the invention 24 match determiners 10 are utilized although it is to be understood that this number is not mandatory. The outputs of the emitter followers 11 that are shown are labeled A1, A2, and E5, and these labels correspond to the positions on the matrix shown in FIG. 2. That is to say, the output labeled A1 is due to the comparison of the video from the corresponding position of the matrix (A1), and this is true for A2, etc. The outputs of the emitter followers 11 are coupled to the combining network 12 as inputs, and consequently, it is seen that all inputs to the combining network are also labeled A1 through E5. The combining network outputs 13 and 14 give right/left error signals and up/down error signals, respectively, in a manner soon to be described with reference to FIG. 3.

Figure 2:
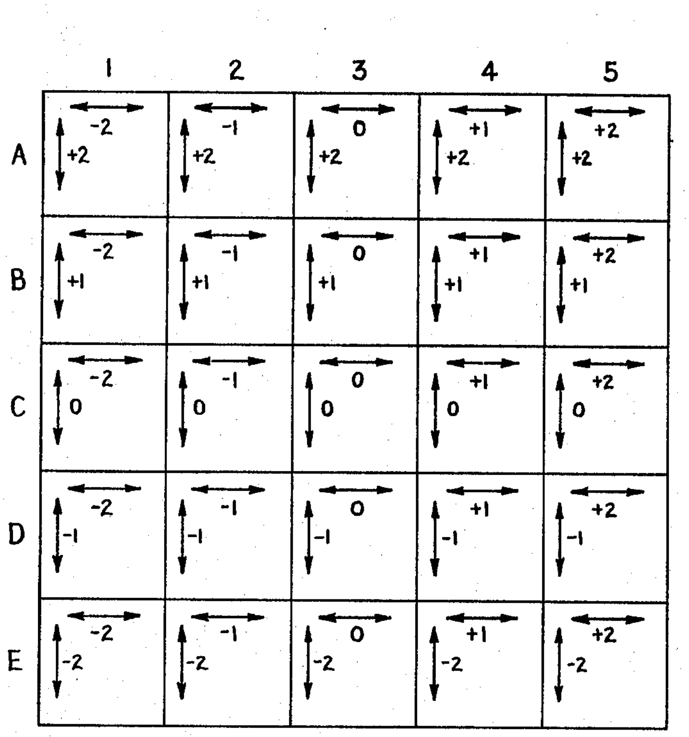
FIG. 2 shows the multiplying factors, which give position information when applied to the comparison signals by the combining circuit.

FIG. 2 shows the multiplication factors which are applied, by the combining network 12, to each position in the matrix. It is seen, for example, that the factors for E5 are +2 in the horizontal plane and −2 in the vertical plane.

Figure 3:
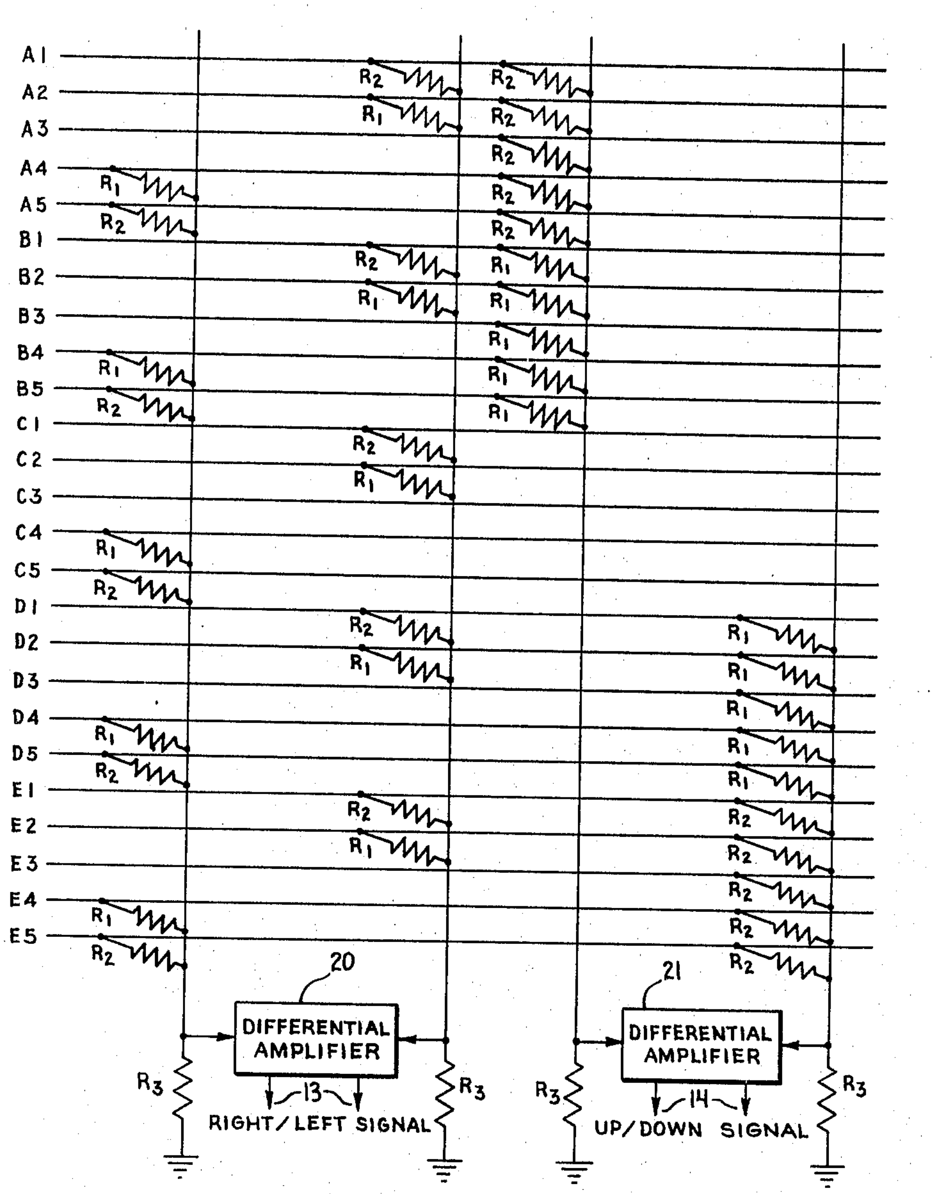
FIG. 3 shows a schematic representation of the combining circuit.

FIG. 3, a combination schematic-block diagram of the combining network 12, shows how the multiplication factors are impressed on the signals to add position information. A differential amplifier 20, processes all of the horizontal signals and a second differential amplifier 21, processes all of the vertical signals. Taking the position E5 as an example, the resistors R2 and R3 are chosen to give a factor of twice that given by the combination of R1 and R3. Therefore the position D4 is factored by the number 1 with respect to the position E5 which is factored by the number 2. The signs are given by connecting all the signals which are to receive a negative factor to one side of the differential amplifiers 20 and 21, and all the signals which are to receive positive factors to the opposite input of the differential amplifiers 20 and 21. The differential amplifier outputs 13 and 14 give the correlation error information.

In the operation of the invention, each camera image element is compared with a matrix of storage tube reference image elements. The same video signal is applied to all the camera video inputs. Each storage tube video signal is different however, and corresponds to a particular resolution element in the storage tube image. It is the purpose of the system in which this invention may be used, to center the position of the camera on the center of the reference image. Therefore, the center of the matrix is not connected to the combining circuit since no error signal is required when the camera is properly positioned. When the camera drifts from the reference image, however, this invention produces an error signal. The comparisons made by the match determiners 10 are performed simultaneously upon the pairs of video signals by sequentially sampling the reference image elements of the storage tube matrix and delaying the sampled results so that the 24 signals are presented to the match determiners 10 at the same time. The output of each match determiner 10 is applied through the emitter-follower circuits 11, to the combining network 12. For a low-light-level system the signal presented to the combining network 12 may be expressed as $N_c + B_c - B_s$ where $N_c$ is that portion of the camera signal due to noise; $B_c$ is the camera signal without noise; and, $B_s$ is the storage tube signal. Since the system is assumed to be quantum-limited, the noise present in any given resolution element will be a function of the brightness of that element. However, it can be assumed that the average noise resulting from video noise in each match signal will be approximately the same over small areas of the image, since adjacent elements are processed sequentially.

In a comparison which is not the correct match, the camera video and the reference video will differ markedly in brightness, with the degree of difference in each case determined by the detail of the target scene. This difference in brightness results in a difference in signal amplitude which can be treated as a second noise signal, and which (like the basic noise signal) will be approximately the same for all comparisons except the correctly matching channel. This noisy signal is defined as $N_t$.

The match signal will then be proportional to $N_c$ for the correct channel, and to $N_c + N_t$ for all other channels. If the match determiner is designed so as to introduce the fixed bias voltage $U_m$, it is possible to obtain the signal $U_m - N_c$ for the correct channel, and the signal $U_m - (N_c + N_t)$ for all other channels.

The latter signal can be considered to be proportional to the relative probability that a particular channel is the correct channel. If the signals from all 24 channels are multiplied by the multiplication factors shown in FIG. 2 (which are chosen in such a way as to add position information to the signals) and are then added together, the resulting sum will give information about the position of the correct match. Assuming that the lower right-hand channel (E5) is the channel with the correct match, the horizontal and vertical sums will be as follows when they are integrated over many resolution elements:

$$\begin{aligned} S_H &= 2\times 4[U_m-(N_c+N_i)]+2[U_m-N_c]+5[U_m-(N_c+N_i)] \\ &\quad -5[U_m-(N_c+N_i)]-2\times 5[U_m-(N_c+N_i)] \\ &= 2U_m-2N_c-2U_m+2N_c+2N_i \\ &= +2N_i \end{aligned}$$

and $$\begin{aligned} S_V &= 2\times 5[U_m-(N_c+N_i)]+5[U_m-(N_c+N_i)] \\ &\quad -5[U_m-(N_c+N_i)]-2\times 4[U_m-(N_c+N_i(]-2[U_m-N_c] \\ &= 2U_m-2N_c-2N_i-2U_m+2N_c \\ &= -2N_i \end{aligned}$$

From the above, it can be concluded that this method yields error signals of the correct polarity. If channel D4 had been chosen, the same values would have been obtained except for the factor 2. It may be pointed out that the factor $N_t$ depends on the amount of scene detail; the greater the amount of scene detail in the particular area of the scene, the larger the amplitude of the error signal will be. This feature will increase the tracking reliability, since more scene detail means a more reliable determination of the correct match.

Other variations of this invention are possible, and it will be understood that various changes in the details, which have been herein described and illustrated in order to explain the nature of the invention, may be made by those skilled in the art within the scope of the invention, and I desire to be limited only in the scope of the appended claims.

I claim:

1. A statistical correlating device wherein a signal from a first source is compared with a matrix of signals from a second source, and wherein the two sources may be a camera image and a reference image with each image divided into a corresponding plurality of elements, comprising:

a plurality of match determiner means for producing the absolute value of the difference between two input signals, each having as a first input the signal from said first source, each having as a second input one of the matrix signals from said second source, and each having an output providing a signal, whereby the signal from one element of the first source is compared with each signal from a matrix of elements from the second source, to determine which combination of elements provides a match; and a combining network means having a plurality of inputs, said inputs being equal in number to the number of said match determiner means, each one of said combining network inputs coupled to the output of a different one of said match determiner means, said combining network means being comprised of a plurality of resistor divider circuits, and a first and a second differential amplifier, said resistor divider circuits being coupled between said combining network inputs and said differential amplifiers, with one-half of said resistor dividers coupled to said first differential amplifier and the other half of said resistor dividers coupled to said second differential amplifier, and wherein said combining network means has outputs which are comprised of the outputs of said first and second differential amplifiers, whereby said resistor dividers add position information to the signals from said match determiner outputs, and said differential amplifiers combine the signals of said match determiner outputs to provide error signals which indicate both direction and amount of error in the correlation.

* * * * *